United States Patent [19]

Gartelmann et al.

[11] Patent Number: 5,230,487
[45] Date of Patent: Jul. 27, 1993

[54] APPARATUS FOR DRIVING AND GUIDING A FLAP SECURED TO AN AIRCRAFT WING

[75] Inventors: Rainer Gartelmann, Bremen; Manfred Seifert, Bremen-Grohn, both of Fed. Rep. of Germany

[73] Assignee: Deutsche Aerospace Airbus GmbH, Hamburg, Fed. Rep. of Germany

[21] Appl. No.: 847,917

[22] Filed: Mar. 6, 1992

[30] Foreign Application Priority Data

Mar. 8, 1991 [DE] Fed. Rep. of Germany ....... 4107556

[51] Int. Cl.[5] ............................. B64C 9/19; B64C 3/50
[52] U.S. Cl. ..................................... 244/216; 244/219
[58] Field of Search .............. 244/212, 213, 215, 216, 244/218, 219

[56] References Cited

U.S. PATENT DOCUMENTS

| | | | |
|---|---|---|---|
| 2,779,555 | 1/1957 | Danielson | 244/216 |
| 3,180,591 | 4/1965 | Ikeda et al. | 244/216 |
| 4,381,093 | 4/1983 | Rudolph | |
| 4,542,869 | 9/1985 | Brine | 244/216 |
| 4,763,862 | 8/1988 | Steinhauer et al. | 244/215 |
| 4,840,331 | 6/1989 | Williams | 244/212 |
| 4,854,528 | 8/1989 | Hofrichter | 244/216 |

FOREIGN PATENT DOCUMENTS

| | | | |
|---|---|---|---|
| 210399 | 2/1987 | European Pat. Off. | 244/216 |
| 469910 | 2/1992 | European Pat. Off. | 244/215 |
| 2213113 | 8/1989 | United Kingdom | 244/213 |

*Primary Examiner*—Joseph F. Peters, Jr.
*Assistant Examiner*—Virna Lissi Ansley
*Attorney, Agent, or Firm*—W. G. Fasse

[57] ABSTRACT

A drive and guide mechanism for a flap such as a landing flap arranged in an aircraft wing, especially in the trailing edge of the wing includes a carriage to which the flap is pivoted. The carriage is movable along a support and guide rail. A drive arm and control system is operated by a drive mechanism (8) with a drive lever (9) which connects a drive rod (10) to the carriage. The kinematic drive mechanism (8) includes a control link (5), a two armed lever or control link (6), a control rod (7), and the drive rod (10). The two armed control link (6) is journalled to the carriage (4) in a tiltable manner. One arm of the two armed link (6) and the control link (5) connect the carriage with the flap (2). The one arm (6a) and the control link (5) form a four bar link with a section of the carriage and a section of the flap. The second arm (6b) of the control link (6) is connected with the drive lever (9) through a drive rod (10). The pivot point (7a) of the control rod (7) is angularly displaced relative to the pivot point (10a) of the drive rod (10). The first mentioned pivot point (7a) further has a spacing (9a) from the rotational axis (A) of the drive mechanism (8) which differs from a respective spacing (9b) of the pivot point (10a) of the drive rod (10).

6 Claims, 4 Drawing Sheets

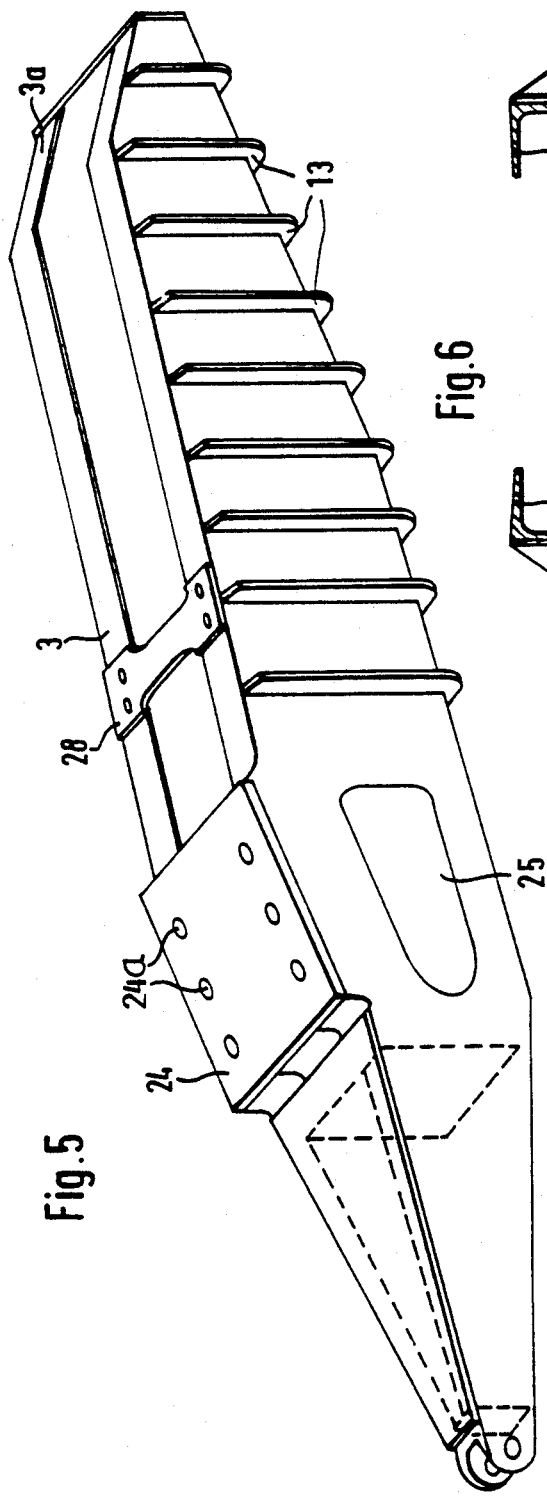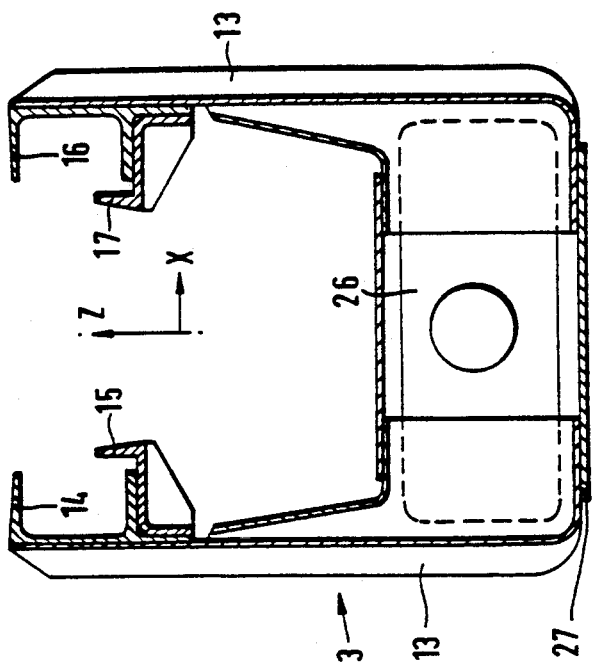

APPARATUS FOR DRIVING AND GUIDING A FLAP SECURED TO AN AIRCRAFT WING

FIELD OF THE INVENTION

The invention relates to an apparatus for driving and guiding a flap secured to an aircraft wing, especially a trailing edge flap.

BACKGROUND INFORMATION

Conventionally, devices for operating a wing flap in an aircraft have a combined carrier and guide rail for a carriage movable along said rail. The flap is movably secured to the carriage by a flap mounting. The flap mounting in turn is connected to a drive mechanism through a drive lever and a drive rod. U.S. Pat. No. 4,381,093 (Rudolph), filed Oct. 7, 1980 discloses an apparatus as described above for retracting and extending trailing edge flap systems on aircraft wings. These systems function as high lift aids during starting and landing. Due to the different aerodynamic requirements to be met during starting and during landing, the rail kinematic mechanisms must be so constructed that the required flap positions can be realized. Thus, the flap positions must assure a maximum lift with a drag as small as possible during starting and a maximum lift with a drag as large as possible during landing. These requirements frequently cause a problem which resides in a relatively large structural height and structural length of said rail and kinematic mechanisms for operating the flaps. As a result, the enclosures which must envelope these mechanisms during cruising flight must thus necessarily be quite involved, whereby they tend to adversely influence the aerodynamic characteristics of the wing.

OBJECTS OF THE INVENTION

In view of the foregoing it is the aim of the invention to achieve the following objects singly or in combination:

to construct an aircraft wing flap drive and guide mechanism in such a manner that it has optimally small dimensions for permitting a substantial improvement in the aerodynamic characteristics of an aircraft wing;

to construct such a mechanism so that the respective flap will not be exposed to undesirable loading conditions; and to improve the construction of the drive and guide mechanism to substantially reduce the weight and costs of such mechanisms.

SUMMARY OF THE INVENTION

The above objects have been achieved according to the invention in a flap operating and guiding mechanism which is characterized in that a two armed lever is mounted to the flap carrying carriage. One arm of the two armed lever is connected through a control rod to a drive lever or rod. The other arm of the two armed lever is connected to the wing flap. The two armed lever forms together with a connector member that connects the flap with the carriage a four bar linkage which includes part of the wing and part of the carriage.

This mechanism according to the invention has several advantages. All forces caused by locking the flap in a fixed position are not anymore taken up by the flap itself. Rather, these locking forces are remaining within the kinematic drive mechanism itself. The locking forces that must be taken into account in a drive mechanism having a carrier and guide rail, pass through the landing flap in conventional systems. The invention avoids such undesirable loading of the flap itself. As a result, the locking loads do not pass through the landing flap according to the invention which makes it possible to dimension the flap itself and its mountings in an optimal manner which means a substantial weight reduction as well as cost reductions. The two rods that engage the drive lever according to the invention, the drive rod and the control rod, are loaded in the present system in a direction opposite to the normal tension direction, while the drive rod of the carriage is exposed to compression loads and the control rod is exposed to tension loads. This type of loading results in an internal force pair that does not cause any feedback to the drive mechanism. As a result, vibrations in the body of the flap itself cannot be transmitted to the drive mechanism, thereby eliminating causes that otherwise might damage the drive mechanism.

Additionally, the drive lever and the two rods connected to the drive lever do not pass through any dead point throughout their entire range of flap movements. Therefore, additional safety measures such as overload switches and/or a constructively provided defined fracture location have been obviated. The construction of the drive and guide mechanism according to the invention makes it further possible to locate the planetary gear drive that is provided as the drive mechanism, approximately in the center of the wing rear spar and thus outside of the deformation range of the guide rails. This feature obviates the otherwise required detours for the drive shafts leading to the drive mechanism. As a result, the drive shafts can be installed along a straight line at the wing rear spar. This feature greatly simplifies the entire construction.

Further features of the invention, as will be described in more detail below contribute particularly to favorable aerodynamic characteristics as well as to an improved safety characteristic of the present apparatus for operating a wing flap.

BRIEF DESCRIPTION OF THE DRAWINGS

In order that the invention may be clearly understood, it will now be described, by way of example, with reference to the accompanying drawings, wherein:

FIG. 5 is a perspective view of a combined support and guide rail according to the invention;

FIG. 6 is a sectional view through the rail according to FIG. 5, perpendicularly to the longitudinal axis of the rail;

DETAILED DESCRIPTION OF PREFERRED EXAMPLE EMBODIMENTS AND OF THE BEST MODE OF THE INVENTION

Figure 1:
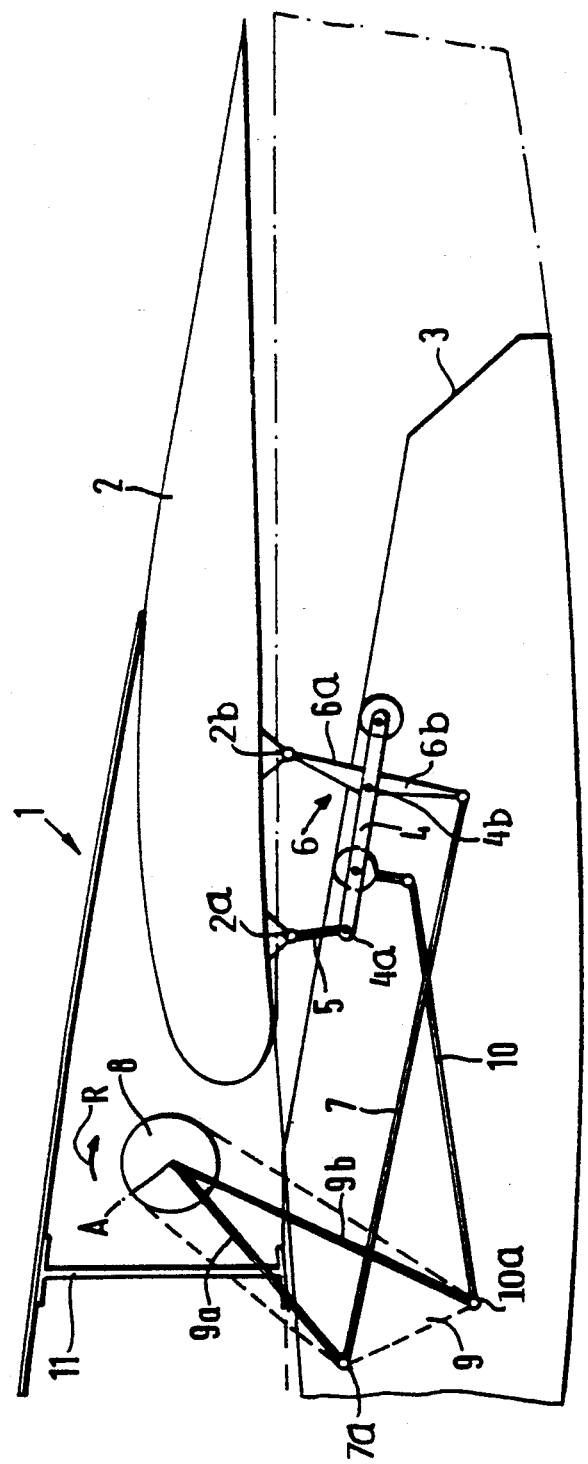
FIG. 1 is a sectional view through the trailing edge of an aircraft wing perpendicularly to the wing rear spar showing a landing flap in a schematic illustration.

FIG. 1 shows a sectional view through the trailing edge of an aircraft wing 1, for example, the wing of a passenger or cargo transport aircraft. The trailing edge or landing flap 2 is mounted according to the invention, on a support and guide rail 3 to be described in more detail below. The flap 2 is driven into the various positions required for landing or starting of an aircraft by a drive mechanism comprising the components 4, 5, 6, 7, 8, 9a, 9b, 9 and 10. These components are guided and supported near the end zones of the respective flap 2.

Figure 9:
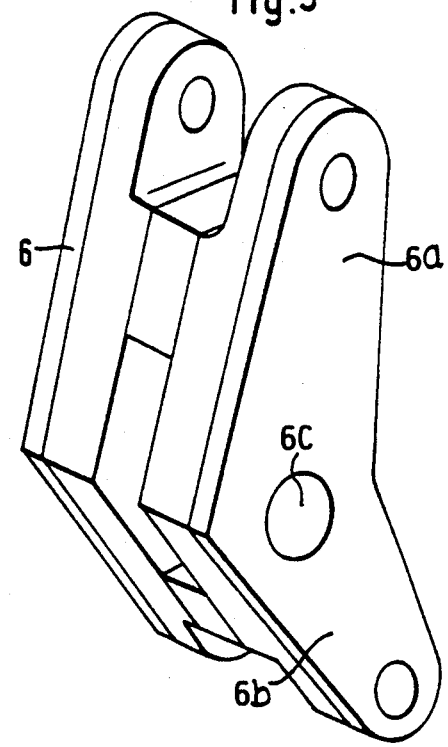
FIG. 9 shows a two armed lever secured to the carriage of FIG. 7.

The support and guide rail 3 shown in more detail in FIGS. 5 and 6 is mounted to the rib and spar structure of the wing and supports a carriage 4 to which the flap 2 is pivoted by two control links 5 and 6. In the shown example embodiment the control link 6 is positioned downstream of the control link 5 as viewed in the longitudinal direction of the aircraft. The control link 6 is constructed as a two armed lever having an upper arm 6a and a lower arm 6b as best seen in FIG. 9. The link 6 has a central through-hole 6c for journalling the link 6 in the carriage 4 by a journal pin passing through the holes 31 in the carriage frame and through the holes 6c in the two armed link 6.

The control link 5, the upper arm 6a of the control link 6, and the portion of the carriage 4 between the pivot points 4a and 4b as well as the flap section between the pivot points 2a and 2b constitute a four bar linkage similar to a parallelogram linkage.

The lower arm 6b of the control link 6 is connected through a control rod 7 and a further drive arm 9a to a drive mechanism 8. The carriage 4 is further connected through a drive rod 10 with a second arm 9b of a drive lever 9 to the drive mechanism 8. The drive arms 9a and 9b from the drive lever 9. The drive arm 9a is shorter than the drive arm 9b so that the pivot point 7a is closer to the rotational axis A of the drive mechanism 8 than the pivot point 10a of the drive rod 10 in the example embodiment shown in FIG. 1. As viewed in the rotational direction R of the drive mechanism 8, the pivot point 7a leads the trailing point 10a by a certain angular value in the clockwise direction. The physical construction of the drive lever 9 is immaterial and thus lever 9 as such is only shown by dashed lines in FIG. 1. In fact, the drive arms 9a and 9b may altogether replace the drive lever 9. The two drive levers or arms 9a and 9b would enclose the angle by which the arm 9b trails the arm 9a in the clockwise direction R. The drive mechanism 8 is a planetary gear drive in the shown example. The planetary gear is mounted to the rear structure of the wing 1, for example, a rear spar 11 by conventional brackets not shown.

Figure 2:
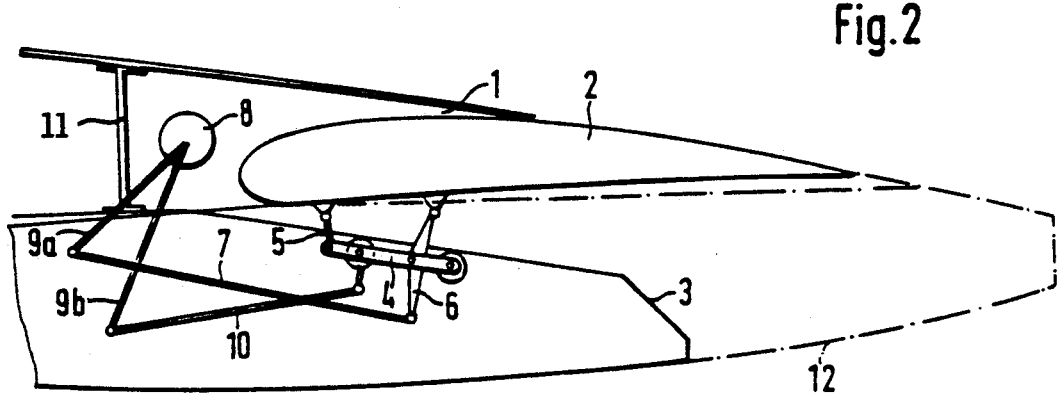
FIGS. 2, 3, and 4 show views similar to that of FIG. 1, but illustrating the flap in three different extended positions.
Figure 3:
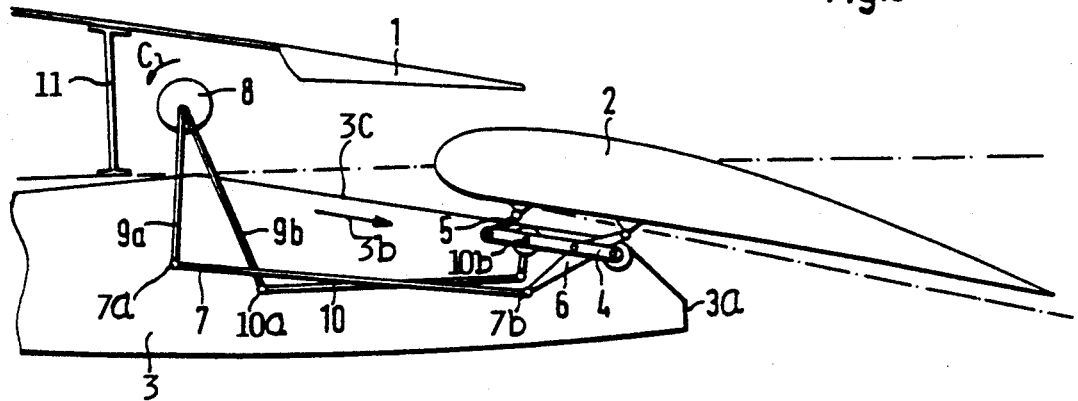
Figure 4:
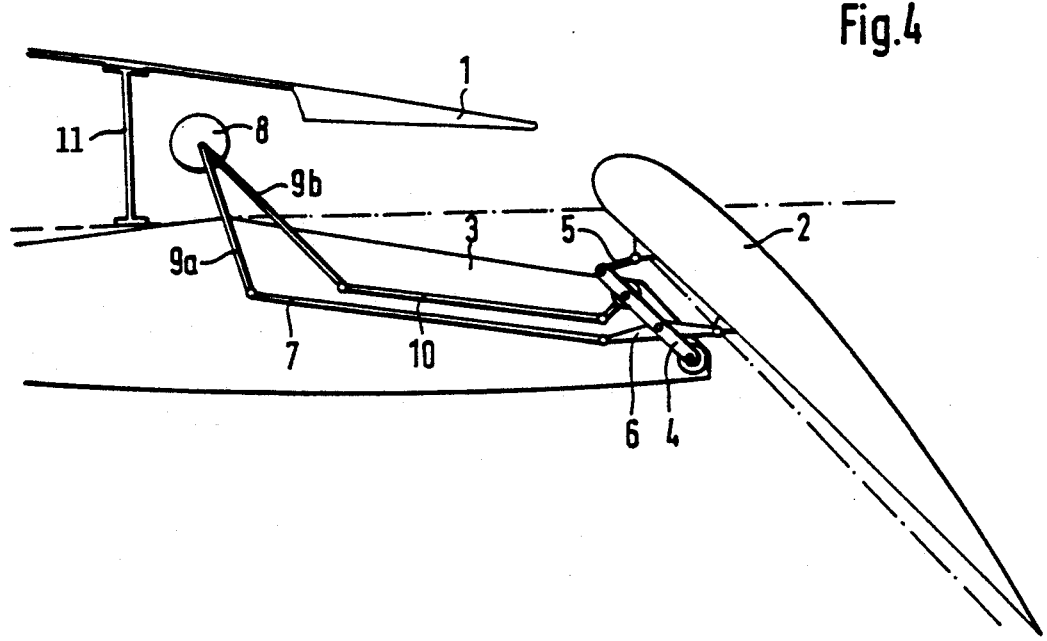

Referring to FIGS. 2, 3, and 4, three different positions of the flap 2 are shown as follows. FIG. 2 shows the flap 2 in a cruising position. FIG. 3 shows the flap 2 in a partially extended position corresponding to a starting or so-called "fowler" position. FIG. 4 shows the fully extended flap 2 for landing.

In FIG. 2 the flap 2 is completely recessed into the contour of the trailing edge of the wing, whereby an enclosure 12 in the form of a so-called fairing completes the wing contour.

In operation, when the drive mechanism 8 rotates counterclockwise as indicated by the arrow C in FIG. 3, the drive arms 9a and 9b also move counterclockwise, thereby pushing the rods 7 and 10 to the right for extending the flap 2. The respective pivot points 7a, and 10a pass through different angular ranges. This feature assures that the rigid connection 10b between the connecting rod 10 and the carriage 4 leads the connection point 7b between the driving rod 7 and the lower arm of the control link 6. As a result, the carriage 4 is moved along the support and guide rail 3 in the direction of the arrow 3b while simultaneously the flap 2 is pulled down toward the rail 3. This feature permits a small structural height for the trailing edge of the wing.

FIG. 3 further shows that by properly selecting the length of the control link 5, it is possible to influence the angle of attack of the flap 2 in this position.

The angle of attack of the flap 2 in this position may also be influenced by varying the length of the distance between the pivot point 4a and 4b where the control links 5 and 6 are pivoted to the carriage 4.

FIG. 4 shows the fully extended position of the flap for landing. This position of the flap is achieved by providing the support and guide rail 3 with a downwardly slanting end section 3a. The end section has a steeper slope than the rail section 3c. As the carriage 4 follows this slanted section 3a, the flap 2 is tilted downwardly as shown in FIG. 4.

FIGS. 5, 6, 7, 8, and 9 show structural details of the drive mechanism the general structure and function of which was described above. FIGS. 5 and 6 show the construction of the support and guide rail 3 having a U-shaped cross-sectional configuration as shown in FIG. 6. The side walls of the rail 3 are reinforced by ribs 13. In the example embodiment the rail 3 is made as a cast aluminum component. The rail 3 comprises inwardly directed load take-up rail sections 14, 15, and 16, 17. The rail sections 14 and 16 extend inwardly from the upper free edge of the rail sidewalls and the rail sections 15 and 17 extend inwardly further down inside the trough formed by the cross-section of the rail 3. These load take-up rail sections guide the wheels 18, 19, 20, and 21 as well as the guide rollers 22, 23 of the carriage 4. Together the rails take up forces in two directions Z and X, as shown in FIG. 6.

A plate 24 forming part of the structure of the rail 3 permits securing the rail 3 to the structure of the wing 1. A cover 25 shown in FIG. 5 provides access into the inside of the rail 3 for mounting the rail 3 to the wing structure, for example, with the aid of screws (not shown) passing through holes 24a in the mounting plate 24. The access under the cover 25 also permits mounting and adjusting the control rod 7 and the drive rod 10. Additionally, maintenance work and inspections may be performed through this access. A torsion stiffening box 26 and a tension strength reinforcing band 27 are mounted in the lower portion of the support and guide rail 3. A traverse brace 28 strengthens the rail 3 in the crosswise direction as shown in FIG. 5.

Figure 7:
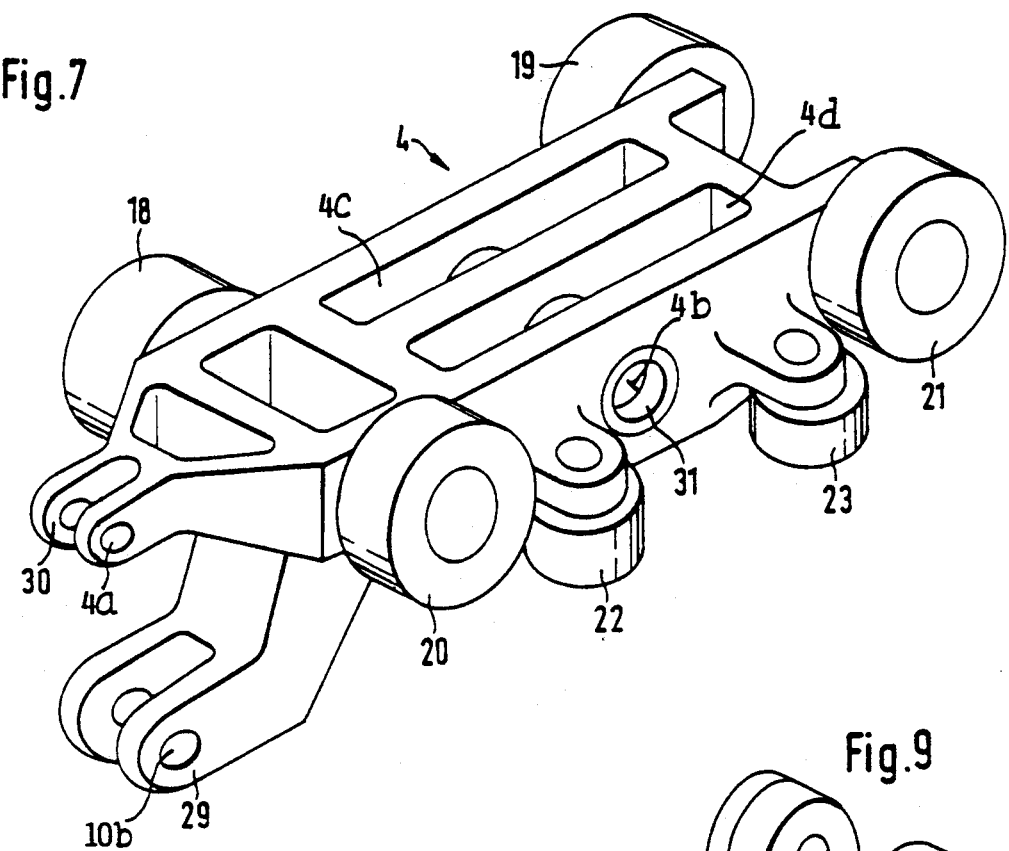
FIG. 7 illustrates a perspective view of a flap carriage for combination with the support and guide rail of FIG. 5.
Figure 8:
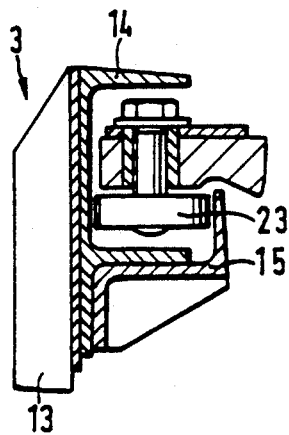
FIG. 8 is a detail view for guiding the carriage according to FIG. 7.

FIG. 7 shows the perspective view of the carriage 4, whereby the carriage is so constructed that the carriage 4, as well as the drive kinematic mechanism with the control links 5, 6 and the drive rods 7 and 10, can be arranged inside the support and guide rail 3, whereby these components are effectively protected.

The drive rod 10 is pivoted to a fork-shaped projection 29 reaching downwardly from the carriage 4. A further forward projection 30 also fork-shaped, serves for pivoting the control link 5 to the carriage 4. As mentioned above, the through hole 31 serves for journalling the control link 6 to the carriage 4, whereby the central portions of the control link 6 are received in recesses 4c and 4d in the frame of the carriage. The central axis of the holes 31 form the pivot 4b and passes through holes 6.

A comparable flap extension characteristic for the trailing edge flap 2 may also be achieved if the control link 5 and the two armed control link 6 are exchanged against each other in their respective installed positions. With this change it is necessary to simultaneously change the length and angular position of the two drive arms 9a and 9b for the control rod 7 and for the drive rod 10 which exchange their functions and are changed or modified respectively.

In both instances the intended extension characteristic is achieved with the same small structural height of the support and guide rail 3 and thus of the entire drive and guide mechanism. As a result, in both instances the same positive effects and advantages for the aerodynamic characteristics of the wing 1 are achieved.

Although the invention has been described with reference to specific example embodiments, it will be appreciated that it is intended to cover all modifications and equivalents within the scope of the appended claims.

What we claim is:

1. An apparatus for driving and guiding of a flap secured to an aircraft, comprising a combined support and guide rail (3), a carriage displaceable along said support and guide rail, means movably securing said flap to said carriage, drive means (8) for positioning said flap including a drive lever (9) and a drive rod (10) which connects said drive lever (9) with said carriage (4), flap positioning means including a flap adjustment control rod (7), a two armed control link (6), means pivoting said two armed control link to said carriage (4), and a further control link (5) pivotally connecting said flap (2) to said carriage (4), said two armed control link (6) having one arm (6b) pivoted to said control rod (7) which in turn is pivoted to said drive lever (9), and a second arm (6a) pivoted to said flap (2), and wherein said further control link (5), said second arm (6a), a portion of said flap, and a portion of said carriage form together a four bar linkage.

2. The driving and guiding apparatus of claim 1, wherein a pivot point (2b) of said two armed lever (6) on said flap (2) is located behind a pivot point (2a) of said further control link (5) on said flap (2), as viewed in the direction of the longitudinal aircraft axis.

3. The driving and guiding apparatus of claim 1, wherein a first pivot point (7a) of said control rod (7) on said drive lever (9) is arranged displaced relative to a second pivot point (10a) of said drive rod (10) on said drive lever (9), by an angular value in the rotational direction in which said flap (2) is moved into a withdrawn (recessed) position, and wherein said pivot point (7a) has a smaller spacing (9a) to a rotational axis (A) of said drive means (8) than a respective spacing (9b) of said second pivot point (10a) from said rotational axis (A).

4. The driving and guiding apparatus of claim 1, wherein said support and guide rail (3) has a rear section (3a) that has a larger inclination than its forward end.

5. The driving and guiding apparatus of claim 1, wherein said carriage (4), said control rod (7), and said drive rod (10) are arranged within said support and guide rail (3).

6. The driving and guiding apparatus of claim 1, wherein said flap (2) is a trailing edge flap of an aircraft.

* * * * *